US008078493B2

(12) United States Patent
Rosenberg et al.

(10) Patent No.: US 8,078,493 B2
(45) Date of Patent: Dec. 13, 2011

(54) METHOD AND SYSTEM FOR PAUSE ADS (75) Inventors: Scott A. Rosenberg, Somerville, MA (US); Matthew H. Self, Redwood City, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1601 days.

(21) Appl. No.: 09/978,170

(22) Filed: Oct. 15, 2001

(65) Prior Publication Data
US 2002/0100041 A1    Jul. 25, 2002

Related U.S. Application Data

(60) Provisional application No. 60/240,715, filed on Oct. 15, 2000, provisional application No. 60/240,714, filed on Oct. 15, 2000.

(51) Int. Cl.
*G06Q 30/00* (2006.01)
(52) U.S. Cl. .......................................... 705/14.4; 725/32
(58) Field of Classification Search .................... 705/14; 707/87, 101; 725/32, 34, 42
See application file for complete search history.

(56) References Cited

U.S. PATENT DOCUMENTS

| 5,272,525 | A |   | 12/1993 | Borchardt et al. |
|---|---|---|---|---|
| 5,333,091 | A |   | 7/1994 | Iggulden et al. ............. 360/14.1 |
| 5,455,630 | A |   | 10/1995 | McFarland et al. ............ 348/476 |
| 5,543,743 | A | * | 8/1996 | Cooper ......................... 327/263 |
| 5,600,366 | A |   | 2/1997 | Schulman |
| 5,610,653 | A |   | 3/1997 | Abecassis |
| 5,652,615 | A |   | 7/1997 | Bryant et al. |
| 5,661,516 | A |   | 8/1997 | Carles |
| 5,664,948 | A |   | 9/1997 | Dimitriadis et al. |
| 5,692,093 | A |   | 11/1997 | Iggulden et al. ................ 386/46 |
| 5,696,866 | A |   | 12/1997 | Iggulden et al. ................ 386/46 |
| 5,708,776 | A |   | 1/1998 | Kikinis |
| 5,740,549 | A | * | 4/1998 | Reilly et al. .................... 705/14 |
| 5,774,170 | A | * | 6/1998 | Hite et al. ....................... 725/34 |
| 5,781,228 | A |   | 7/1998 | Sposato |
| 5,826,168 | A |   | 10/1998 | Inoue et al. |
| 5,848,397 | A |   | 12/1998 | Marsh et al. |

(Continued)

FOREIGN PATENT DOCUMENTS

AU            694568         3/1996

(Continued)

OTHER PUBLICATIONS

CNN.com [online], retrieved from the World Wide Web at URL:http//www.cnn.com/ on Dec. 6, 2001.

(Continued)

*Primary Examiner* — John Weiss
*Assistant Examiner* — Bennett Sigmond
(74) *Attorney, Agent, or Firm* — McDonnell Boehnen Hulbert & Berghoff LLP (57) ABSTRACT

A system and method for displaying ads on a client-side video replay system during a pause mode. The method may comprise determining that the video replay system should enter a pause mode, obtaining an ad, and displaying the ad on a display of the video replay system during the pause mode. Determining that the system should enter pause mode may include detecting that a user has pressed a pause button located on a remote control or a display screen. The system may comprise a display, a processor, memory, and software applications configured to (i) determine that the system should enter a pause mode, (ii) obtain an ad, and (iii) display the ad on the display.

22 Claims, 10 Drawing Sheets

U.S. PATENT DOCUMENTS

| | | | |
|---|---|---|---|
| 5,884,141 A * | 3/1999 | Inoue et al. | 725/101 |
| 5,886,731 A | 3/1999 | Ebisawa | |
| 5,948,061 A | 9/1999 | Merriman et al. | |
| 5,959,621 A * | 9/1999 | Nawaz et al. | 715/733 |
| 5,987,210 A | 11/1999 | Iggulden et al. | 386/46 |
| 5,995,092 A | 11/1999 | Yuen et al. | |
| 5,999,688 A | 12/1999 | Iggulden et al. | 386/46 |
| 6,108,484 A | 8/2000 | Lim et al. | |
| 6,215,526 B1 | 4/2001 | Barton et al. | |
| 6,233,389 B1 | 5/2001 | Barton et al. | |
| 6,286,005 B1 | 9/2001 | Cannon | |
| 6,310,886 B1 | 10/2001 | Barton | |
| 6,324,338 B1 | 11/2001 | Wood et al. | |
| 6,327,418 B1 | 12/2001 | Barton | |
| 6,332,127 B1 * | 12/2001 | Bandera et al. | 705/14.55 |
| 6,349,410 B1 * | 2/2002 | Lortz | 725/110 |
| 6,360,053 B1 | 3/2002 | Wood et al. | |
| 7,017,173 B1 * | 3/2006 | Armstrong et al. | 725/87 |
| 7,039,933 B1 | 5/2006 | Chen et al. | |
| 7,225,142 B1 * | 5/2007 | Apte et al. | 705/14.39 |
| 7,337,456 B1 | 2/2008 | Nihei | |
| 2001/0049820 A1 | 12/2001 | Barton | |
| 2002/0036655 A1 * | 3/2002 | Yulevich et al. | 345/744 |
| 2002/0072972 A1 * | 6/2002 | Lamont | 705/14 |
| 2002/0083439 A1 | 6/2002 | Eldering | |
| 2002/0090198 A1 | 7/2002 | Rosenberg et al. | |
| 2002/0097235 A1 | 7/2002 | Rosenberg et al. | |
| 2003/0037068 A1 * | 2/2003 | Thomas et al. | 707/200 |
| 2003/0195797 A1 | 10/2003 | Klug | |
| 2005/0267994 A1 | 12/2005 | Wong et al. | |

FOREIGN PATENT DOCUMENTS

| | | |
|---|---|---|
| AU | B36802/95 | 7/1998 |
| DE | 199 39 410 A1 | 3/2001 |
| EP | 0 693 215 B1 | 11/1998 |
| EP | 0917060 A1 | 5/1999 |
| EP | 1 071 287 A2 | 1/2001 |
| EP | 1 071 287 A3 | 3/2001 |
| WO | WO 96/08921 A1 | 3/1996 |
| WO | WO 97/31315 | 8/1997 |
| WO | WO 98/51076 | 11/1998 |
| WO | WO 98/59493 | 12/1998 |
| WO | WO 99/04561 A | 1/1999 |
| WO | WO 99/04561 A1 | 1/1999 |
| WO | WO 99/52279 A1 | 10/1999 |
| WO | WO 99/52285 A1 | 10/1999 |
| WO | WO 00/07368 A1 | 2/2000 |
| WO | WO 00/18108 A2 | 3/2000 |
| WO | WO 00/18108 A3 | 3/2000 |
| WO | WO 00/28736 A1 | 5/2000 |
| WO | WO 00/44171 | 7/2000 |
| WO | WO 00/44171 A1 | 7/2000 |
| WO | WO 00/56072 A1 | 9/2000 |
| WO | WO 00/58833 A1 | 10/2000 |
| WO | WO 00/58834 A1 | 10/2000 |
| WO | WO 00/58967 A1 | 10/2000 |
| WO | WO 00/59214 A1 | 10/2000 |
| WO | WO 00/62298 A1 | 10/2000 |
| WO | WO 00/62299 A1 | 10/2000 |
| WO | WO 00/62533 A1 | 10/2000 |
| WO | WO 00/67475 A1 | 11/2000 |
| WO | WO 01/06370 A1 | 1/2001 |
| WO | WO 01/22729 A1 | 3/2001 |
| WO | WO 01/46843 A2 | 6/2001 |
| WO | WO 01/47238 A2 | 6/2001 |
| WO | WO 01/47249 A2 | 6/2001 |
| WO | WO 01/47279 A2 | 6/2001 |
| WO | WO 01/65762 A2 | 9/2001 |
| WO | WO 01/65862 A2 | 9/2001 |
| WO | WO 01/76249 A1 | 10/2001 |
| WO | WO 01/89203 A2 | 11/2001 |
| WO | WO 02/33973 A2 | 4/2002 |
| WO | WO 02/33975 A2 | 4/2002 |
| WO | WO 02/056577 | 7/2002 |

OTHER PUBLICATIONS

International Search Report for PCT Application No. PCT US01/32169, which published as WO 02/33973, mailing date Jul. 7, 2002.

AdServer Software Solution, The Platform for Tomorrow Built on a Flexible, Extensible Business Object Framework, downloaded from the World Wide Web at http://www.doubleclick.net/ on Oct. 28, 2000.

* cited by examiner

```
502 ─ <val name="ad_adid" type="value32">1025</val>
504 ─ <val name="ad_rev" type="value32">0</val>
506 ─ <val name="ad_type" type="string">pause</val>
508 ─ <val name="ad_pools" type="string">9002</val>
510 ─ <val name="ad_files" type="string">"bmp/1025.bmp"</val>
512 ─ <val name="ad_triggers" type="string">"g_tod"</val>
514 ─ <val name="ad_genre" type="string"/>
516 ─ <val name="exp_placement" type="string">((g_time>=968630400)&&
        ((79200<=g_tod)||(g_tod<=75540)))&&((((g_time-l_last_time)>= 18000) &&((g_occs-
        l_last_occ)>=1))</val>
518 ─ <val name="exp_expired" type="string">((l_occs>=50)||(g_time>=969580800))</val>
520 ─ <val name="exp_weight" type="string">40</val>
522 ─ <val name="exp_weight2" type="string">16777215-l_last_occ</val>
524 ─ <val name="exp_winner" type="string">"bmp/1025.bmp"</val>
526 ─ <val name="stmt_winner_update" type="string">l_occs=l_occs+1;
        l_last_time=g_time;l_last_occ=g_occs</val>
528 ─ <val name="exp_winner_log" type="string">print g_programtitle</val>
530 ─ <val name="ad_preserve_list" type="string">"l_occs", "l_last_time", "l_last_occ"</val>
532 ┌ <val name="l_occs" type="value32">0</val>
     │ <val name="l_last_time" type="value32">0</val>
     └ <val name="l_last_occ" type="value32">0</val>
```

Fig. 5
Example control info (one parameter set per ad)

| Parameter Name | Parameter Type | Example Value | Description |
|---|---|---|---|
| g_occs | integer | 100 | Count of total ad occurrences that have ever been placed on this system. |
| g_lastad | integer | 1045 | Identifier of last ad to be placed on system. |
| g_lastad_time | integer | 969300900 | Time in epoch seconds of last ad placement. |
| g_time | integer | 969394500 | Current time in epoch seconds (only updated every 15 minutes.) |
| g_dow | integer | 2 | Current day of week (Monday = 1.) |
| g_dom | integer | 25 | Current day of month (begins with 1.) |
| g_doy | integer | 156 | Current day of year (begins with 1.) |
| g_month | integer | 4 | Current month of year (January = 1.) |
| g_year | integer | 2001 | Current year |
| g_tod | integer | 47700 | Time of day in seconds, 0-86399 |
| g_ad_pools | string | [1411, 5013, 4] | List of identification #s associated with current viewing program. |
| g_channelid | integer | 10672 | Unique TMS channel ID. |
| g_programstart | integer | 969391800 | Time in epoch seconds that current viewing program began airing. |
| g_programtitle | string | Judge Judy | Name of current program |

Fig. 6
Example global and context parameters

Fig 7(a)
Example ad control info
(one ad control table per ad)

Fig. 7(b)
Example trigger info
(not all ads have triggers)

Fig. 8
Heap (top of heap is next ad to be placed)

METHOD AND SYSTEM FOR PAUSE ADS

RELATED APPLICATIONS

This application claims priority under 35 U.S.C. §119(e) to both U.S. Provisional Application No. 60/240,715, filed Oct. 15, 2000, and entitled "Method and System for Dynamic Ad Placement," and U.S. Provisional Application No. 60/240,714, filed Oct. 15, 2000, and entitled "Method and System for Pause Ads," both of which are incorporated by reference herein in their entirety.

TECHNICAL FIELD

The present invention relates generally to video data recorders and, more specifically, to a method and system for determining and playing ads in video data recorders.

BACKGROUND OF THE INVENTION

Advertisers have long tried to make sure that the right people are watching their advertisements. Television advertisers spend large amounts of money trying to make sure their advertisements ("ads") are aired during television shows having the proper demographics. Thus, television advertisers attempt to match the ad to the demographics of the audience for particular television programs, purchasing advertising slots for those television programs that they hope will attract the proper audience for their ads. Unfortunately, there is no way for the advertisers to know in real time whether people are watching their ads or whether the ads are reaching the targeted demographic groups. Similarly, there is no way for television advertisers to determine the viewing patterns of individual viewers or to target ads to individual viewers since the same ads are broadcast to everyone watching a particular program.

Advertisers on the Internet have been targeting their ads for several years. An Internet advertiser can currently register for an ad-serving service, which attempts to distribute the advertiser's ads to users who will be receptive to the ads. To view a web page on the Internet, a user enters the URL of the web page or clicks on a link to the web page. The web page itself is fetched from the appropriate web server, and an ad is fetched from the ad service. The ad service attempts to determine which ad to send to the user based on which web page the user has requested and on various other factors known about the user (such as, for example, information about the user gleaned from cookies or from user registration procedures). Because the ad service is located on the server side, the ad service generally relies on one-size-fits-all rules to determine which ads to display for a particular page request. Because the ad selection process is centrally located, performance requirements often necessitate a simplification of the logic used to select an ad.

In addition, an Internet ad service is "coupled" to the user request. An Internet ad server bases the ad it serves, at least partly, on the URL of the requested web page. It is also important to note that the Internet ad server needs to send an ad to the user as quickly as possible, because the user is expecting to receive the requested web page (along with any other third party content, such as ads) as soon as possible. The fact that the typical Internet ad server is time-constrained makes it more difficult for the ad server to perform elaborate methods to determine which ads to send. Overcoming this problem typically requires the use of very high-end computers to serve the ads.

Ultimately, Internet ad serving solutions are request-based. That is, an ad is served from the central server in response to a request. Because many requests are fulfilled in parallel, ads for competing products may be served for each of the separate requests. While in theory the server could track ads being served to each client and eliminate the serving of two competing ads to the same client, the centralized ad serving environment, with millions of users and with ad serving distributed over many actual servers, makes this extremely difficult.

Moreover, an Internet ad server needs to be in substantially constant communication with the Internet, since ad requests are received constantly. Such a system was not designed to work in situations where the ad-receiving client is only intermittently connected to the Internet.

What is needed is a way to deliver ads to receptive audiences where there is ample time to determine who might be the best target for each particular ad and where the decision is sensitive to the context in which the ad request was made. In addition, it is desirable to be able to place ads extremely quickly for each individual user. Lastly, it is desirable to locate opportunities to insert additional ad content to the video playback.

SUMMARY OF THE INVENTION

The described embodiments of the present invention display an ad or similar video picture during a pause interval that occurs when the user places the video replay device in a pause mode. The pause ad (or other video) can be a still or a moving picture. One embodiment displays an advertisement (either a still or a moving picture). One embodiment displays a user-selected ad or wallpaper design (such as family photos or video movies).

The process of determining which ad to display is called the ad selection process. The described embodiments decouple the ad selection process from the request for ad content. It should be understood that the invention can be employed in a variety of devices, such as video data recorders and set-top boxes, where the device is not in continuous communication with an initial ad source.

The context in which the described embodiment operates is an individual user's video replay system, although the invention is not intended to be limited to video replay systems. In a video replay system, a user selects program content by replaying previously "taped" content from a hard drive or similar storage medium or by turning on his television (or other content source) and selecting a program or show to watch. In the latter case, the selected program content is received by the replay system; it is first stored on the storage medium and then displayed on a display device such as a television set or monitor. A dynamic ad placement engine of a preferred embodiment preferably operates within the video replay system and needs to select ads only for a single video replay system. The ad placement engine in a particular video replay system always selects ad content for that video replay system and does not have to spend time trying to determine the identity and preferences of every possible viewer of the content since only a very small subset of viewers watch content on a particular video replay system.

In the described embodiment, the device containing the dynamic ad placement engine is not necessarily always in communication with an initial source of ads. For example, an ad source might communicate with a video replay system periodically, such as once a day or several times a week, either at a set time or in response to an instruction or query, to obtain information about ads that may be displayed on the device.

Additionally, in the described embodiment, a dynamic ad placement engine knows about the current context of the system before an ad request is received. In the described embodiment, the ad selection process is "decoupled" from the ad content delivery process. Various software applications in the video replay system can determine at which times and under which circumstances they desire to display ads. The applications do not necessarily rely on whether the user has changed the content being viewed to determine when to request and display ads. This system is CPU-efficient and allows ads to be evaluated "at leisure" before they are served.

The described embodiments of the present invention do not select ads for placement at the time that the user selects his viewing content. Instead, the described embodiment of the present invention allows the user to select content as a separate function. Ad selection is not performed at the time of user content selection, but instead, is asynchronous to the user's actions in selecting programming to watch. Thus, the ad selection engine gains evaluation time to make a more informed decision about which ad should be displayed next by the video replay system.

BRIEF DESCRIPTION OF THE DRAWINGS

FIG. 5 is an example set of rules that comprise an ad control file.

DETAILED DESCRIPTION OF PREFERRED EMBODIMENTS

Embodiments of the present invention are now described with reference to the figures where like reference numbers indicate identical or functionally similar elements.

The described embodiment contains a dynamic ad placement engine as one component in an advertising system. The described advertising system is preferably located in a device, such as a video replay system, (for example, a video replay system sold by ReplayTV, Inc. of Mountain View, Calif.), although the present invention can be used with other devices, including other video replay systems, including but not limited to interactive TV, set-top applications and devices, and handheld video players.

1. Example Video Replay System

Figure 1A:
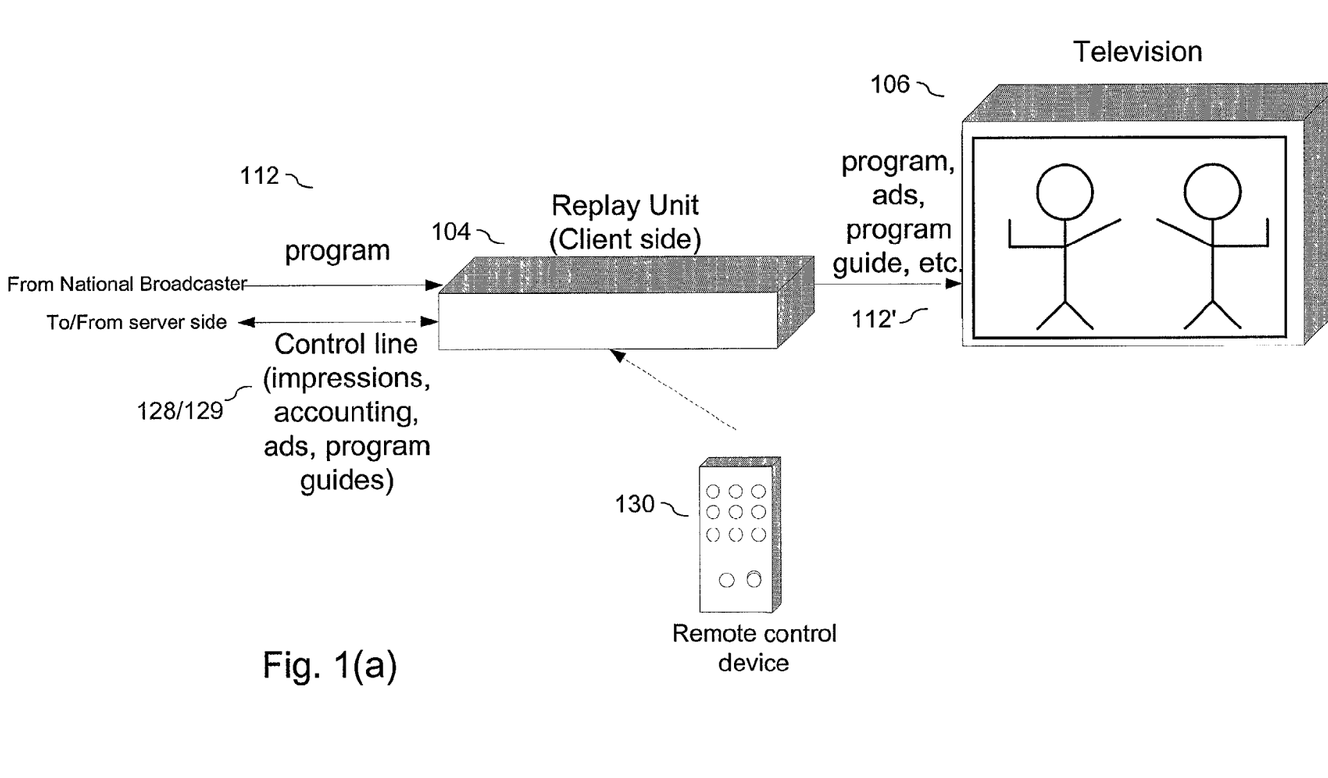
FIG. 1(a) is a block diagram of a video replay system that can include ad placement software in accordance with the present invention.

FIG. 1(a) is a view of a client-side video replay system 104 and a display 106. In the Figure, the program 112 (such as a television program) is received from a broadcaster and is passed to a display (such as a television set) 106, along with other content such as ads and programming guides. The invention can be implemented in a wide range of devices and is not limited to video replay units. The client-side unit 104 contains a storage medium (not shown), such as a hard drive, which is used to store the incoming program signal and other information. The saved signal can then be viewed at a later time or can be viewed immediately from the storage medium. The client-side unit 104 includes a processor and memory (or similar components used to direct the functionality of the unit) and implements the described functions for the particular unit 104. Client-side video replay system 104 can make placement decisions when disconnected from the initial source of ads, such as an ad server.

The client-side video replay system 104 receives control information 128, such as ads and program guides, from a server and sends control information 129, such as ad impressions and accounting information, to the server. It should be understood that the system can receive various types of programming, including but not limited to cable content, television content, high definition TV content, digital TV content, pay per view content, and content broadcast over the Internet. It should also be understood that display device 106 can be any appropriate type of display device, including but not limited to a digital or analog television set, an Internet appliance, a cellular device, or a wireless device. The video replay unit and the display device may be separate (as shown), integrated together, or broken into even more functional units than shown.

It will be understood that one implementation of the video replay system uses a telephone line to implement one or more of control lines 128/129. The information is passed to and from the client side 104 on a regular basis (such as every 24 hours). Thus, the system downloads ads from the server relatively infrequently. In the described embodiment, the system receives information over a telephone line and receives daily all the ads it is going to place for the next 24 hours. Other implementations use an Internet connection as control lines 128/129 and connect regularly or on a more frequent basis.

FIG. 1(a) also shows a remote control device 130, which is used to control the video replay system. In other embodiments, the system is controlled, for example, over the Internet or by way of controls on the client-side unit 104 itself.

2. Client-Side Video Replay System a. Ad Placement Engine

The primary responsibility of an ad placement engine in accordance with the described embodiments is evaluation, placement, and logging of advertising placement on its individual video replay system. In a described embodiment, a software application requests an ad (or indicates the existence of an ad opportunity). These ads may be, for example, ads displayed during a user-initiated pause in the displayed video stream. Other types of ads include main ads to be placed in a main menu of the video player and ads to be placed in banners or in areas of the display reserved for ads. The described embodiments of the present invention can be used in any client side element with any software application that places ads in an appropriate location and circumstance.

The described embodiments decide which ads to place based on factors such as the context, history, user profile, and constraints specific to each ad. One example of user context might include the program currently being viewed by the user. It should be noted that the user may have been viewing this current program for any previous amount of time (hours, minutes, or seconds). In some implementations, ad placement may occur after a user's initial request for a video program or other content.

Figure 1B:
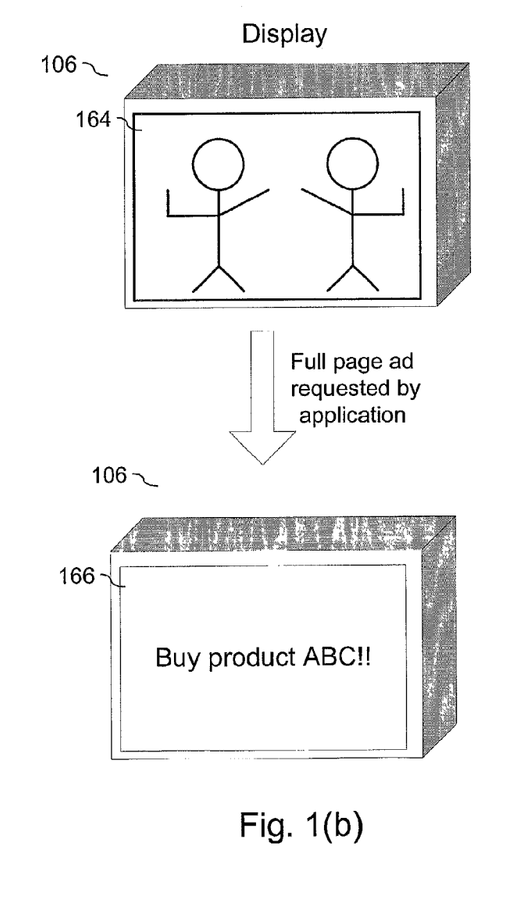
FIG. 1(b) is an example of a video replay system displaying a full page ad.

FIG. 1(b) is an example of a video replay system displaying a full-page ad. In the example, display 106 in a video replay system is caused to display the current program 164, which can either be a program currently being received by the system or a program received previously. At some point in time, in this example, a software application that controls the display decides to display a full page ad. As described below in detail, the application requests an ad from a dynamic ad placement engine and displays the resulting ad 166 on the display 106. It is important to note that, in the displayed embodiment, the application's request for an ad is decoupled from the user's request for content. For example, the user may have watched the same program/content for several hours, but when he pauses the program to get a snack, the application may decide to request and display a full page ad as shown. In contrast, the user may channel surf all night, changing the programs displayed on display 106 every few minutes. In certain implementations, the user's actions may trigger a request for an ad and in other implementations, a night of channel surfing will not trigger such as request. Request and display of ads is under control of the controlling application. In some embodiments, an ad is requested as soon as the user presses the pause button. In other embodiments, for example, the ad is requested a predetermined amount of time after the user presses the pause button.

Figure 1C:
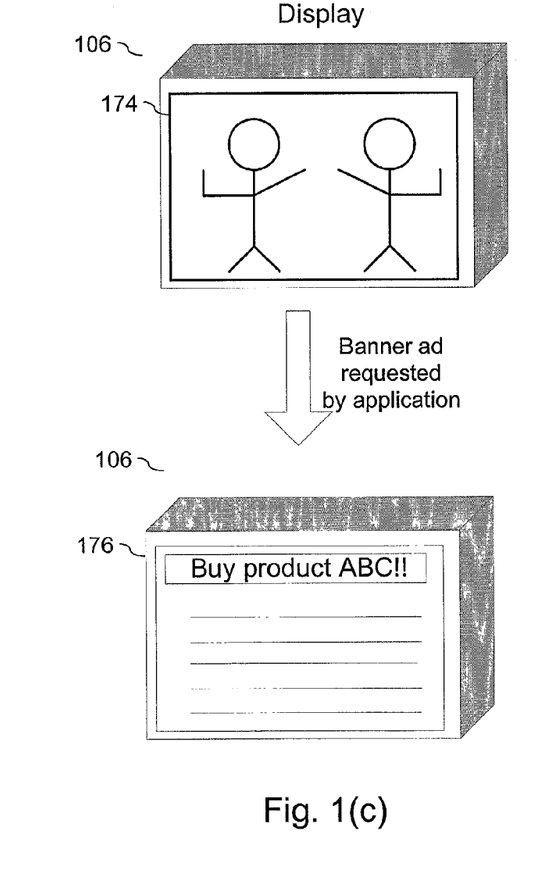
FIG. 1(c) is an example of a video replay system displaying a banner ad.

FIG. 1(c) is an example of a video replay system displaying a banner ad 176. A banner ad can be displayed in a predetermined portion of the display or in a portion of the display decided by the application controlling the display. In one embodiment, banner ad 176 is displayed along with the program guide displayed on display 106. In other embodiments, banner ad 176 is displayed as part of a "zone" guide display or next to the program content.

Figure 2:
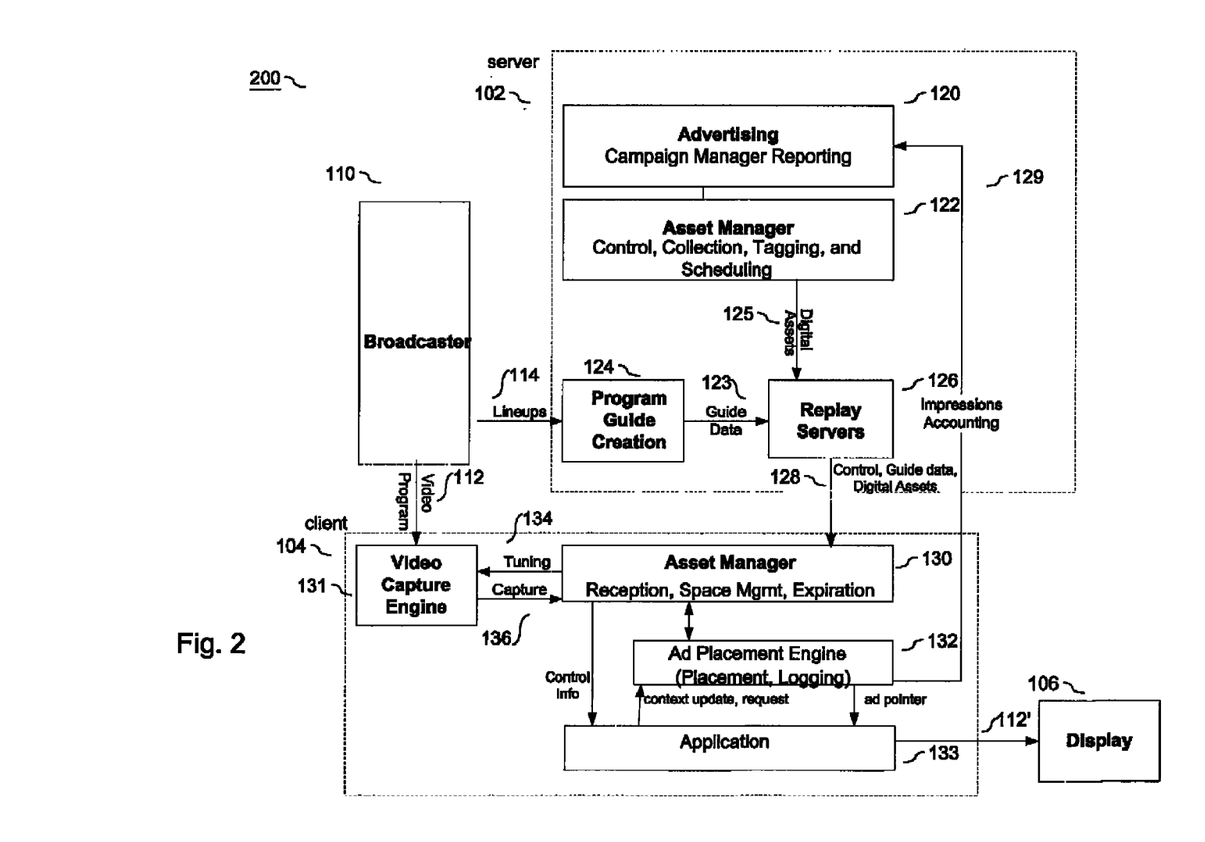
FIG. 2 is an overview of a video replay system.

FIG. 2 is a block diagram of a server side and a client side of an example video replay system 200 that can include ad placement software in accordance with the present invention. The figure includes a server 102, as well as client 104 and display 106. The system receives signals from a broadcaster 110, such as a television, cable, or pay-per-view broadcaster that broadcasts one or more programs 112 (such as a video broadcast) to a video capture engine 131 on the client side 104. The video capture engine 131 contains a tuner (if needed) to select which of the possible programs 112 to receive and a storage medium (such as a hard drive) that retains the program 112 as it is received. The user can then choose to either display the program 112 as it is being received or save the program 112 for playback at a later time (or both).

Server 102 includes an advertising section 120 that allows a user to create ad campaigns, perform ad management, and perform advertisement tracking (both placement and viewing tracking); an asset manager 122 that manages distribution of ads, tracking information, etc; a program guide creation section 124, and one or more replay servers 126. Lineups 114 of programs to be broadcast in the future are sent to program creation guide 124, which creates program guide data 123 that is passed to the client side 104 via replay server 126. Asset manager 122 collects, tags, and creates scheduling rules for ads (digital assets 125). Digital assets 125 (such as ad content and ad rule sets) are passed to the client side 104 for display in accordance with the present invention. A broadcast schedule (such as scheduling rules) is passed to the client side 104 for use in electronic programming guide applications. As discussed below, some of the electronic programming guide data may also be used in guiding placement of ads. Information passed to client side 104 from replay server 102 is designated as reference numeral 128.

The client 104 includes the video capture engine 131, which passes captured programming content to asset manager 130. Asset manager 130 also passes tuning data to video capture engine 131, indicating when the user has, for example, changed the television or cable channel.

The client side 104 also includes an ad placement engine 132 that communicates with asset manager 130. Ad placement engine 132 is described in detail below. One or more applications 133 communicate with ad placement engine 132 to register ads. It will be understood that the described system is but one possible example of a video replay system incorporating the present invention.

Figure 3:
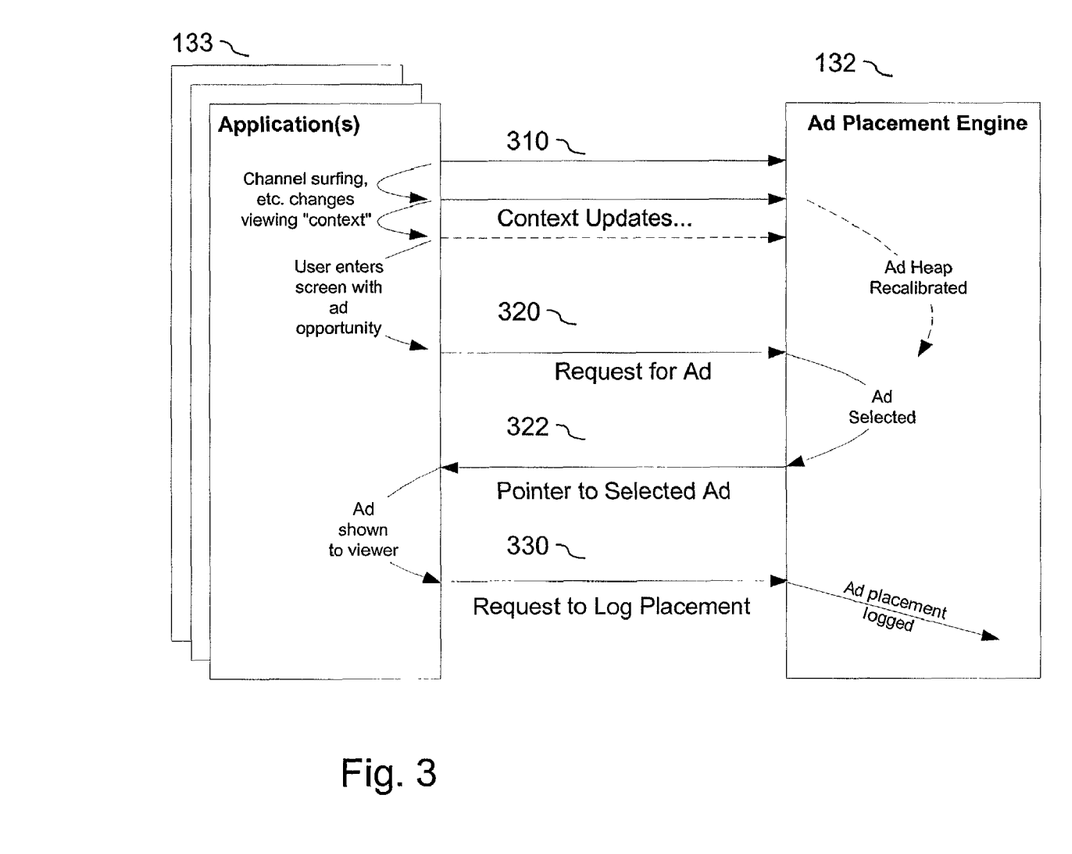
FIG. 3 is a diagram of interaction between an application and ad placement engine in a video replay system.

FIG. 3 is a diagram of interaction between one or more software applications 133 and ad placement engine 132 in a client-side video replay system 104. It should be understood that the application 133 can be any appropriate application, including but not limited to an electronic programming guide or video viewed by a user. The described applications 133 have the ability to detect a change of viewing context in the system. For example, the user might change the television channel so that a new program is displayed on display 106. This channel change causes a change in viewing context.

When application 133 detects a viewing context change (or soon thereafter), it sends a context update 310 to ad placement engine 132. Ad placement engine 132 updates its context information as discussed below. (For example, the global parameter g_programtitle as shown in FIG. 5 might be altered to reflect the new program title). In the Figure, zero or more viewing context changes can occur before a request for an ad is made. If, for example, the user is channel surfing, many frequent context updates might be made before a request for an ad is made. If the user watches the same program for several hours, many requests for ads might be made, but no context updates might occur. The context changes can include, but are not limited to context changes resulting from the user changing the channel on the video replay system. Other context changes include changes in time (i.e., time passing) and program changes within a channel.

Figure 8:
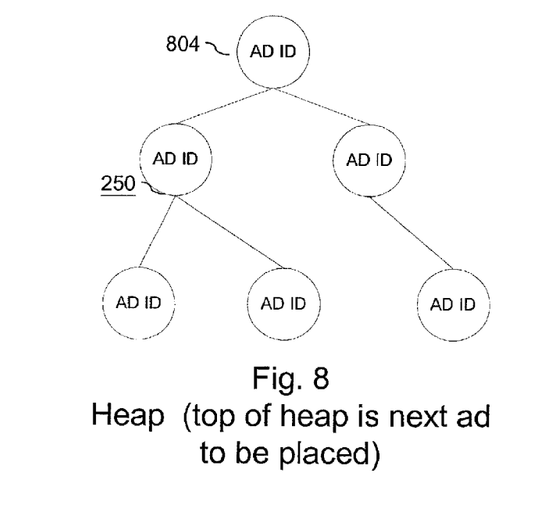
FIG. 8 shows an example of a heap data structure.

As shown in FIG. 3, when ad placement engine 132 receives a context update, it recalibrates an order and weight of ads in a heap data structure (see FIG. 8). This step may also add ads to or delete ads from the heap. In the described embodiment, this step constitutes recalibrating the ad heap as described below in connection with FIG. 9(b).

When a screen with an ad opportunity is to be displayed, application 133 requests 320 an ad from ad placement engine 132. In the described embodiment, an application might request an ad in several situations. For example, the user can choose to "pause" programming that he is currently viewing. Because the programming is "spooled" in video capture engine 131 (or was previously stored in video capture engine 131 and is now being replayed), the video capture engine 131 saves the incoming programming signal during the period that the display is "paused." In the described embodiment, the pause function begins to display an ad for a predetermined period of time after the pause occurs. For example, the ad may be displayed 10 or 20 seconds after the display has been paused. In the described embodiment, the ad displayed in pause mode is generally a full-page ad (see FIG. 1(b)), although it could also be another appropriate type of ad. Thus, the user no longer sees the paused content on display 106 and begins seeing the ad. In the described embodiment, the user can indicate that he does not want to see pause ads—either as a global indication that affects all pause ads, or on a case by case basis, where the user cancels individual pause ads. Certain applications also allow the user to set the amount of time that passes before pause ads are displayed in pause mode.

After an ad is selected, it is returned 322 to the application 133, where it is displayed.

In another embodiment, the application interjects ads into predetermined areas of the electronic programming guide (see, for example, FIG. 1(c)). Thus, whenever the application is going to display the electronic programming guide, it requests an ad and inserts the ad into the predetermined area of the electronic programming guide. This ad may be a fullscreen ad or a banner ad that does not fill the whole screen. For example, the ad may be a banner ad inserted by the application into a "zone" page that displays various categories or "zones" of programming (news, sports, content from predefined licensing partners, etc). It should be understood that a dynamic ad placement engine in accordance with present invention can be used to supply ads to any appropriate application. Moreover, in certain embodiments, the application 133 and the ad placement engine 132 are merged and are not separate modules.

After an ad is successfully displayed, application 133 sends a request 330 to log placement of the ad.

Figure 4:
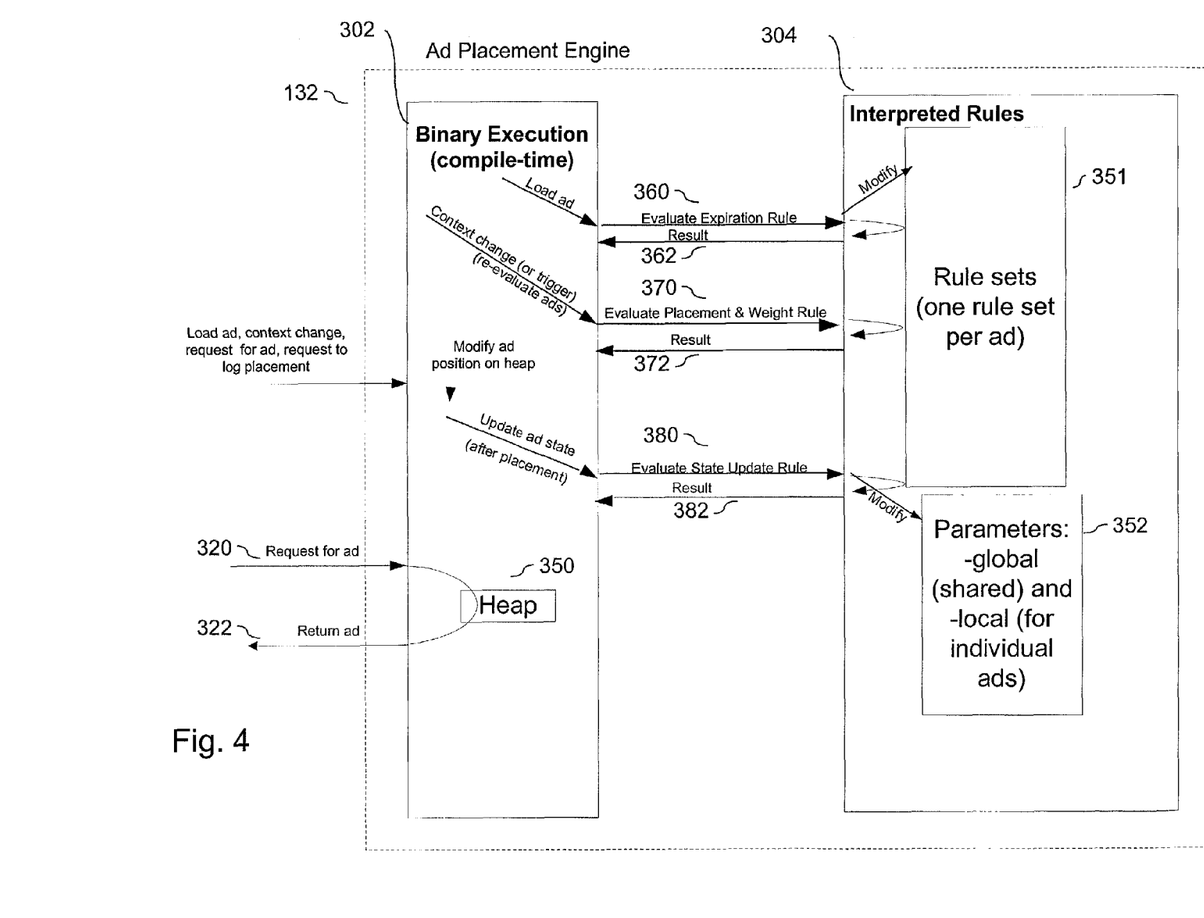
FIG. 4 is a block diagram of elements in the ad placement engine of FIG. 3.

FIG. 4 shows detail of ad selection. In response to a request for an ad 320, ad placement engine 132 selects an ad from the top of an ad heap 350 and returns 322 the selected ad to the requesting application where it is displayed in an appropriate manner. As shown in FIGS. 3 and 4, the heap 350 may have been recalibrated between the time a context update 310 was received and an ad request 320 was received. Ad placement engine 132 preferably is not directly responsible for user-interface (UI) functionality, such as ad rendering or user navigation. On the other hand, ad placement engine 132 makes informed decisions based on the current application context. The fact that the context update information 310 is exchanged in advance of a request for the ad allows the ad placement engine more time to select an optimal ad. When the user finally surfs to an appropriate screen location for ad placement (as determined by the application), the application 133 requests an ad from the ad placement engine 132. When an ad placement request 320 occurs, the ad placement engine 132 consults it ad heap 350 and returns the ad at the top of the heap (or the ad that is highest weighted thus far if it runs out of time in systems requiring an ad to be returned within a maximum time frame). The information returned in response to an ad request contains enough information that the application can display the ad.

Lastly, after the ad has been displayed, application 302 sends logging information 330 to ad placement engine 132 to inform ad placement engine 132 that the ad has been displayed. Ad placement engine 132 logs the logging information and eventually passes the logging information to server 102.

FIG. 4 is a block diagram of elements in ad placement software 132 of FIG. 3. These elements include executable ad placement software 302 and interpreted runtime rules 304. The executable ad placement software 302 contains the runtime functionality of the ad placement software 132. The rules 304 are executed by a rule interpreter at runtime. In the described embodiment, the entry and exit points for rule evaluation are known and fixed at compile time of software 302. For example, the weight afforded a particular ad may be determined by a rule executed at runtime and, therefore, be known only at run-time, while the timing and frequency of the evaluation of the weight determination rule is performed only as determined at compile-time of software 302. Additionally, data structures that are used to prioritize and manage the ads (e.g., the heap 350) exist in the executable domain 302. The mix of executable/binary functionality and interpreted rules in the described embodiment provides a combination of both flexibility and performance. Other embodiments may use other combinations of binary and/or interpreted software. FIG. 4 is provided by way of example only.

In this embodiment, ads maintain their own state (for example, through local parameters discussed below). Rules for an ad reference that ad's local state, as well as global context parameters, permitting some flexibility in the values returned by the rule.

When a new ad is loaded from server 102, executable ad placement software 302 loads the ad control file containing the rule set that describes the ad and stores it as a new rule set in rule sets 351 on the executable side. In certain embodiments, ads have a rule that determines the ad's expiration date. For each ad, executable ad placement software 302 evaluates the interpreted rules 304 to determine whether an older version of the loaded rule has expired 360. If the older version of the ad has expired, its rule set is removed from the system. In any case, the new rule set for the new ad is stored in rule sets 351. A status is returned 362 from the expiration request.

When a context change is received (or a trigger event occurs as described below), the placement and weight of the ads are reevaluated 370 in accordance with the placement and weight rules of the respective ads. A placement and weight result is returned 372 for each ad and the position of the ads in the heap are modified accordingly.

When an application indicates that it has placed an ad, a state update is sent to interpreted rules 304 so that the local parameters of the rule set for the ad can be updated. A status of the update is returned 382.

b. Example Ad Control File

FIG. 5 is an example rule set that comprises an ad control file. Each ad has an associated ad control file. An ad control file is the unit sent to client 104 and defines the appearance, placement, and other rules associated with an ad. The example is encoded in XML format, although any appropriate format will suffice. Each rule 502-532 has a parameter name, type, and value. Note that the rules whose names start with "exp" and "stmt" reference both local parameters for the ad and to global parameters (discussed below.) The rules whose names start with "1_*" define local parameters. Each rule evaluates to a value of the type defined in the rule (value32, string, etc).

As shown in FIG. 5, the name space includes <parameter, value> pairs. Parameters can be one of several types, including string, int, floating point. In a preferred embodiment, the parameters are stored on disk, which is memory efficient, but slow. Because the decision as to ad placement is decoupled from the context change and does not have to be performed quickly, the slow access due to storage of the parameters on disk is acceptable. Other embodiments may store parameters in memory.

c. Ad Parameters

Figure 6:
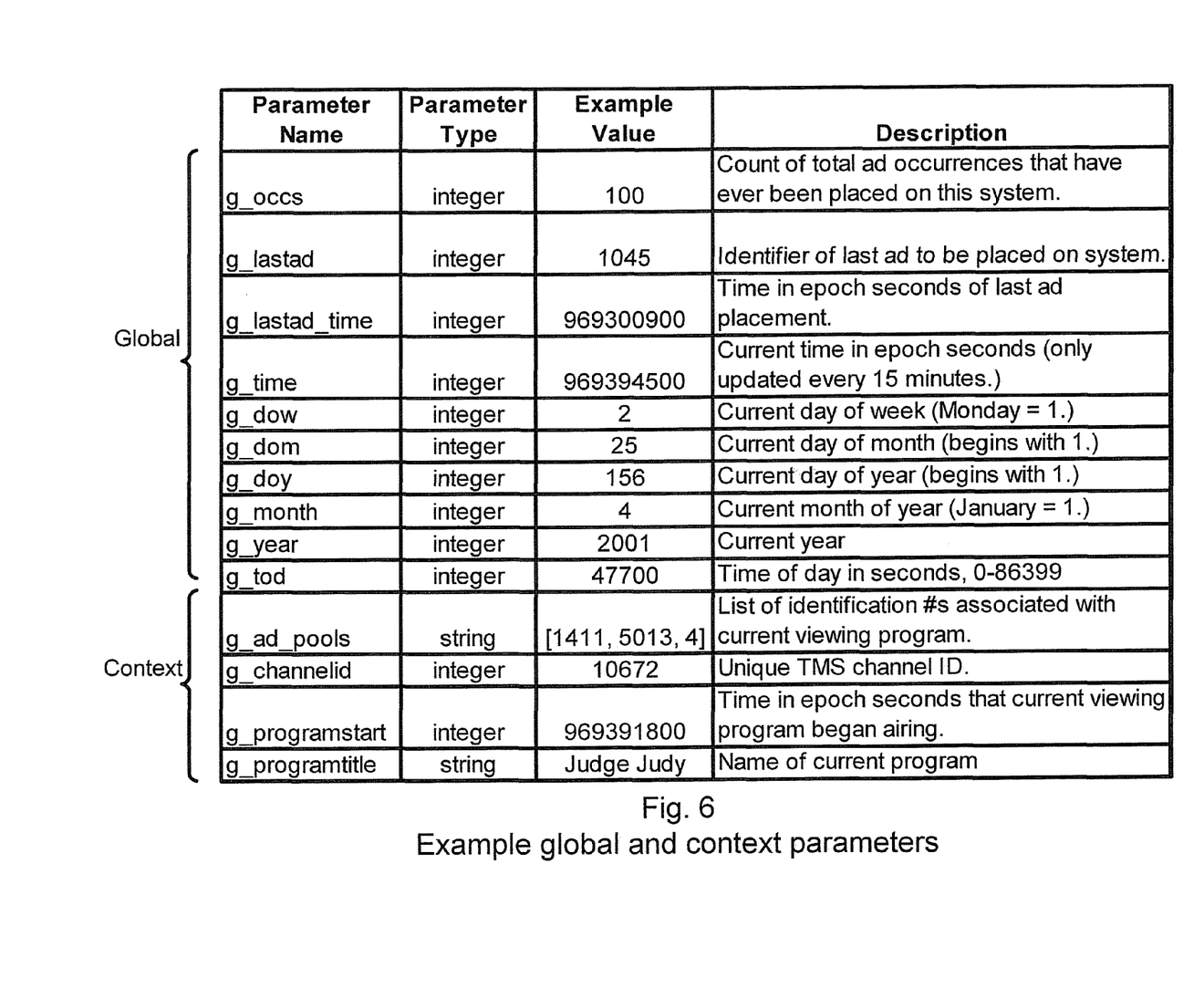
FIG. 6 shows examples of types of ad parameters

FIG. 6 shows examples of types of ad parameters that are referenced in the rules. Global and context parameters (such as time and day of week, genre, and channel) are updated asynchronously to ad placement. Local ad parameters (such as impressions and "previous/last placement") are updated following ad placement.

d. Data Structures

Figure 7A:
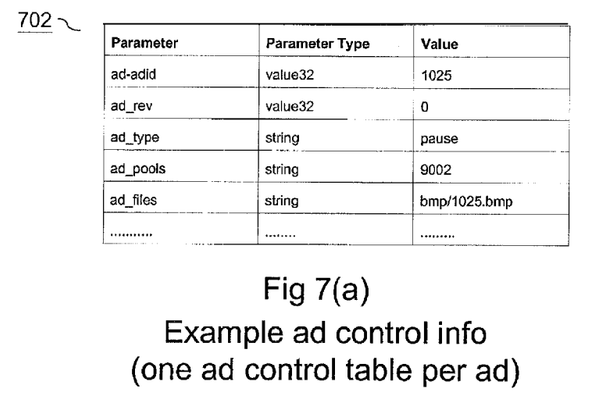
FIG. 7(a) shows the example rules of FIG. 5 in table form.

FIG. 7(a) shows some of the example rules of FIG. 5 in table form as they might be stored in interpreted rules software 304. Any appropriate manner of storing parameters, rules (here, a type of parameter), and triggers may be used to implement the present invention.

Figure 7B:
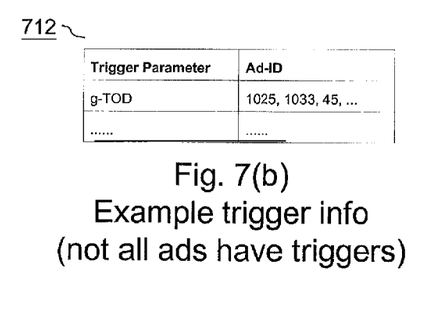
FIG. 7(b) shows an example trigger table, including the trigger for the ad of FIG. 5.

FIG. 7(b) shows an example trigger table, including the trigger parameter for the ad of FIG. 5. In this example, the trigger is TOD (time of day). Whenever the global TOD parameter is updated, the placement value of the ad 1025 is re-evaluated. It should be noted that not all ads have an associated trigger. Some ads have more than one associated trigger.

FIG. 8 shows an example of a heap data structure. As known to persons of ordinary skill in the art, a heap is a data structure in which the children of a node are guaranteed to have a lower priority than the parent. In the present case, this means that the node at the top of the heap 350 has a highest placement priority and is the ad that should be placed next in response to an ad request. Note that, in a preferred embodiment, the heap is updated after a system context change. However, when an ad request is received by the ad placement engine, the heap is already ordered such that the node on the top of the heap corresponds to the ad that should be placed next and no additional work must be performed on the heap in response to an ad request. Thus, the ad placement engine's response time to an ad request can be extremely fast.

In the described embodiment, heap 350 is ordered according to the following formula for each ad:

Placement value*weight.

Thus, each ad has a placement value as defined by the ad's placement value rule. Some ads have weights, as defined by one or more weight rules. Whenever an ad is reevaluated, the ad's placement value is re-determined and multiplied by its weight(s), if any. This may result in ads being added to or deleted from heap. In the described embodiment, if an ad has a placement value of "0" it is moved to the bottom of the heap. Otherwise the ad is placed on the heap 350 in a location in accordance with its weighted placement value.

e. Flowcharts

Figure 9A:
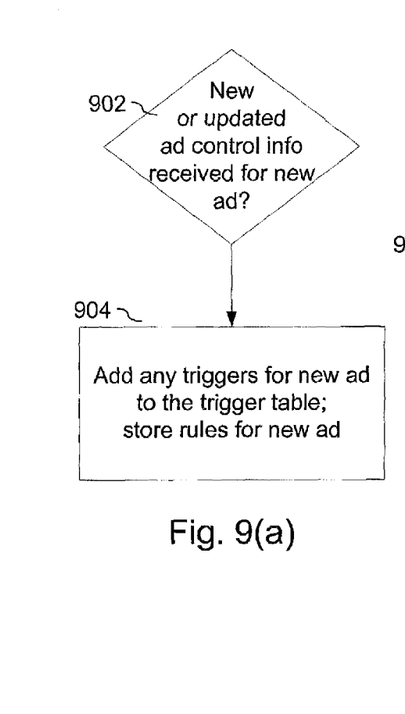
FIG. 9(a) shows a flowchart of a method performed when a new ad control file is received from the server.

FIG. 9(a) shows a flowchart of a method performed when a new ad control file is received from the server. When a new ad is received, any triggers of the ad are added to the trigger table. The rules of the new ad are stored. If appropriate, old versions of the rules are replaced.

Figure 9B:
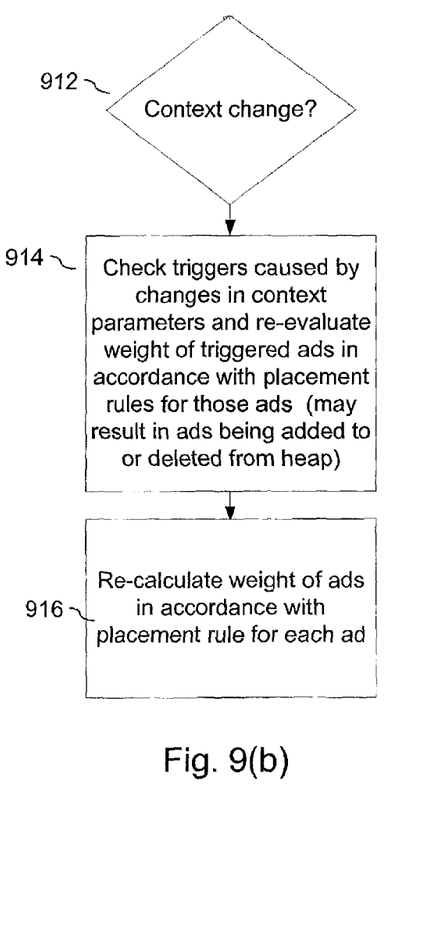
FIG. 9(b) shows a flowchart of a method performed when a context update occurs.

FIG. 9(b) shows a flowchart of a method performed when a context update occurs. First, the trigger table is checked to determine whether any affected context parameters are triggers for any ads. A placement value and one or more weight values are calculated for the ads.

Figure 9C:
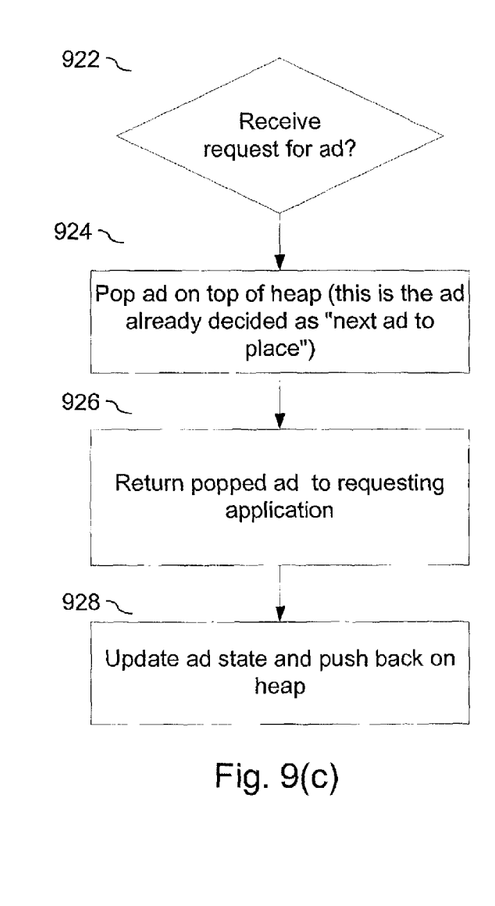
FIG. 9(c) is a flow chart showing a method for selecting an ad in response to an ad request.

FIG. 9(b) is a flowchart showing a method performed when context parameters are updated in the system. When a parameter is updated, the trigger table is checked to see if the parameter is a trigger parameter for any ad. If so, the system re-evaluates the placement values of triggered ads in accordance with the placement rules of the ads (this may result in ads being added to the heap). In the example of FIG. 5, the trigger parameter is TOD. Thus, when the global TOD parameter is updated, as it is periodically, the placement rule and weight is determined for the triggered ad having ad_id 1025 and the ad is added to its proper location in heap 350. FIG. 9(c) is a flow chart showing a method for selecting an ad in response to an ad request. In the described embodiment, the ads in heap 350 have already been ordered for the current context. Thus, the top ad is popped from heap 350 and returned as the ad to be displayed. In certain embodiments, local variables of the popped ad are re-evaluated at this point. Once an assurance is received that the ad was displayed, the placement value (and weight) of the ad is recalculated and the ad is placed back on the heap as shown in FIG. 4. In the example, the weight2 value will force the ad to be moved to the bottom of the heap. Thus, if the context is not updated for a long period of time, all the ads on the heap will be displayed in a round robin manner as each is forced to the bottom of the heap after it is displayed.

f. Placement Rules

The following paragraph discusses the example placement rule exp_placement. Each ad in the system has an associated ad placement rule. This placement rule will be delivered to the client through the same mechanism that other ad-specific parameters are delivered. The rule is a Boolean construct, with the following syntax:

| | |
|---|---|
| Expression: | Operand \| Operand Binary-op Operand |
| Operand: | Number \| String \| NULL \| Identifier \| "(" Expression ")" |
| String: | " " " ASCII-characters " " " |
| Number: | Integer-constant \| Floating-constant |
| NULL: | "N" "U" "L" "L" |
| Binary-op: | "+" \| "−" \| "/" \| "*" \| "==" \| "!=" \| "<" \| ">" \| ">=" \| "<=" \| "\|\|" \| "&&" |

An operand that references an undefined parameter evaluates to 0 or " ", depending on the context.

In the described embodiment, placement rules can determine the placement of an ad in accordance with one or more parameters relating to context (for example, program title); history (for example, number of total occurrences ever displayed on this system); user profile (for example, a viewer category number might be pushed to the device from a server or might be derived); and frequency (for example, time in epoch seconds of last ad placement).

Example Placement Rules:

```
/* viable if time has exceeded 968630400 (epoch seconds) */
exp_placement = g_time>=968630400
/* viable if time of day is between 79200 and 75540 seconds */
exp_placement = (79200<=g_tod)&&(g_tod<=75540)
``` g. Ad Weighting

The evaluation of a placement rule for an ad is a value that is used by default to weight the placement of the ad among all other currently viable ads.

Note that this functionality could be embedded into the placement rule itself with no change in logic, but for the sake of clarity may be separated into separate weighting evaluation. This separation also models the fact that the "business rules" or placement logic may be defined in a separate phase of the ad sales process than the weighting. Weighting will most likely be defined as part of the trafficking or post-sales process.

Thus, the separation into two parameters allows the placement and weighting logic to be constructed during separate phases of the sales process.

Example Weighting Rules:

```
/* a constant weight throughout the life of the campaign */
exp_weight = 40
/* an increasing weight proportionate to time passed */
exp_weight = 40 + (((g_time − 968630400)/2419200)*20)
``` h. Expiration Rules

In the described embodiment, expiration rules are evaluated at load time and before and after placement.

The same namespace and syntax used for a placement rule can be used to implement an expiration rule. An expiration rule is evaluated whenever the ad list is rehashed and periodically during operation. An evaluation that yields non-zero indicates that the advertisement has expired. The expiration rule will be delivered as a parameter called "rule_expiration."

Example Expiration Rules:

```
/* ad is expired if occurrences exceeds 50 or a time is passed */
exp_expired = ((1_occs>=50)||(g_time>=969580800))
``` i. State Update Rules

Every ad will store a limited number of local parameters that are used in the evaluation of the ad's placement, weighting, and expiration rules. Following placement of an ad, any of these parameters can be updated according to a set of state update rules. The syntax for these rules is:
Assignment-list: Assignment-statement Assignment-list
Assignment-statement: Identifier "=" Expression ";"
Note: Expression is defined as above in the Placement Rules section.
The state update rule is evaluated once following each successful placement of the ad. Other embodiments implement several state update mechanisms, including one for successful placement, one for failed placement, etc.

Example State Update Rules:

```
/* bump local count of occurrences */
stmt_winner_update = 1_occs=l_occs+1;
/* set time and occurrence count of placement */
stmt_winner_update = 1_last_time=g_time;1_last_occ=g_occs
``` j. Round-Robin Placement with Priority

In the described embodiments, an order of priority rotates through ads in round-robin fashion. An ad's position in rotation should be preserved through reboots. Deletion, substitution, or addition of an ad does not reset its position in the rotation. As described above, this order of rotation is currently implemented using the weight2 parameter which forces an ad to the bottom of the heap 350 after the ad is placed.

k. Other Rules in the Example

The following paragraphs discuss other rules in the example of FIG. 5.

Ad_id 502: an identifying number for this ad.

Ad_rev 504: a revision number for this ad. This parameter allows an ad to expire if other ads with the same name have a higher ad_rev value.

Ad_type 506: This specifies a type of ad request for which this ad will be placed. For example, this ad will only be placed when an application requests a "pause" ad. In the described embodiment, pause ads are of a size to fill the entire screen (in contrast to banner ads, which are smaller). Other types include banner ads and ads appearing on a zone page, next to a type of programming zone.

Ad_pools 508: This specifies a type of programming for which the ad will be placed. For example, the value "9002" may indicate that the ad will be placed only for science fiction programming. Pools may also reflect geographic groups.

Ad_files 510: This specifies one or more "collateral" files needed to display the ad. For example, a collateral file may include a bitmap graphic needed to display the ad. Collateral files can also be broadcast separately form the ad control file.

Ad_triggers 512: as discussed above, the parameter TOD is a trigger for this ad. Any parameter can be a trigger.

Ad_genre 514: currently unused

Exp_placement 516: placement rule for this ad. This ad is placed when the expression yields a value of true. It is evaluated when ever the context changes.

Exp_expired 518: expiration rule for this ad.

Exp-weight 520 and Exp_weight2 522: The first weight is used to weight the placement value for this ad before the ad is placed in the heap. The second weight is used, in this embodiment, to force the ad to go to the bottom of the heap after it is displayed. This helps in aiding a round robin placement order.

Exp_winner 524: This string is passed to the application to tell it which file to display representing the ad.

Stmt_winner_update 526: This causes the specified local variables to be updated when the ad is popped off the stack.

Exp_winner log 528: This string gets written to the log when the ad is displayed.

Ad_preserve list 530: This indicates local parameters that are to be kept for this ad.

L_occs: L_last_time: L_last_occ 532: These are local parameters used for this ad.

3. Pause Ads

As described above, one type of ad that can be displayed is a pause ad. A pause ad is an advertisement (or similar video picture or movie) displayed during a pause interval, which occurs when the user places the video replay device in a pause mode. The pause ad (or other video) can be a still or a moving picture (such as a video clip). One embodiment displays an advertisement (either a still or a moving picture). One embodiment displays a user-selected ad or wallpaper design (such as family photos or video movies).

In some embodiments, the application requests an ad as soon as the user presses the pause button. In other embodiments the ad is requested a predetermined amount of time after the user presses the pause button. For example, the ad may be displayed 10 or 20 seconds after the display has been paused to give the user time to view the paused display. The amount of time before an ad is displayed can be user-definable. In a preferred embodiment, the ad displayed in pause mode is generally a full-page ad (see FIG. 1(b)), although it could also be another appropriate type of ad. Thus, the user no longer sees the paused content on display 106 and begins seeing the ad. In a preferred embodiment, the user can indicate that he does not want to see pause ads—either as a global indication that affects all pause ads, or on a case by case basis, where the user cancels individual pause ads preferably via an on-screen button or any other appropriate mechanism). Certain embodiments also allow the user to set the amount of time that passes before pause ads are displayed in pause mode. Certain embodiments also allow the user to set the type of pause ads he wishes to view, excluding other types of pause ads.

A preferred embodiment includes an ad type representing user-supplied content. For example, the user may decide that he wants a candid photo from his last vacation to appear on the screen when the pause button is pressed. The user might also select a short moving video clip. In a preferred embodiment, these pictures or moving video clips are obtained from any appropriate source, such as the user's home computer (connected to the video replay unit directly or via a network such as the Internet) or from another user over a network such as the Internet. In such an embodiment, the video replay unit includes functionality to interface with the source of the video and to download the video and store it within the video replay unit. Alternately, the video could be stored externally to the video replay unit and retrieved when needed. The video replay unit could also interface with another video replay unit to allow users to exchange videos (moving or still) over a network such as the Internet.

Figure 10:
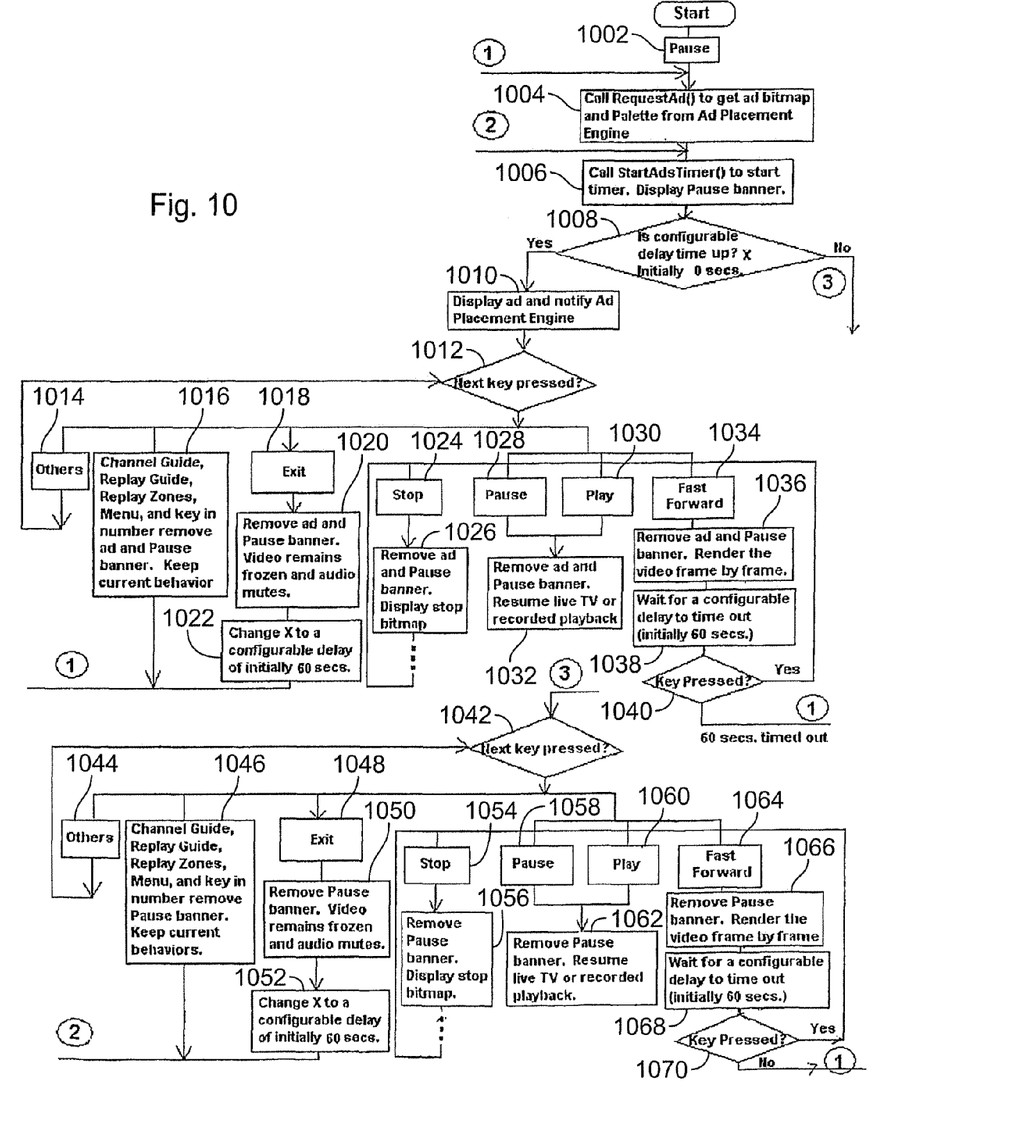
FIG. 10 is a flow chart showing a method of displaying a pause ad (or other video).

FIG. 10 is a flow chart showing a method of displaying a pause ad (or other video). The video replay unit enters pause mode 1002 by, for example, the user pressing a pause key on the screen, the remote control, or the unit itself. In the described embodiment, the application displays 1004 a banner indicating that the unit has entered pause mode and starts a timer. If the timer indicates that a configurable time delay is up 1008, the application obtains an ad from an ad source, such as the ad placement engine described above. Other embodiments of the present invention can obtain ads from other appropriate sources, such as the Internet or an external storage location. As already mentioned, the ad can be a commercial advertisement or it can be another type of still or moving video, such as a user-supplied picture or video. The ad is displayed on the paused video screen and the ad placement engine is notified that the ad was placed (if appropriate).

The application then performs various functions depending on the next key pressed 1012. If the user indicates that the unit should display a channel guide, replay guide, or replay zone menu 1016, the ad is removed from the display. If the user selects an exit function 1018, the ad is removed from the display, although the video remains frozen and the audio remains muted 1020. In the described embodiment, the configurable delay value is changed to 60 seconds.

If the user indicates a stop function 1024, the application removes the ad and displays a stop bitmap. If the user indicates a play function or indicates pause for a second time (i.e., toggles the pause) 1028, 1030, the application removes the ad and resumes live or recorded playback 1032. If the user indicates a fast forward function 1034, the application removes the ad and renders the video frame by frame 1038 until another key is pressed 1040.

Steps 1042-1070 are similar to steps 1012-1040. Steps 1042-1070 are performed when a key is pressed before the pause ad has been displayed (i.e., when the configurable delay time of step 1008 has not yet timed out) and the user had indicated new functionality.

In both steps 1040 and 1070, when a key has not been pressed, but a predetermined time period (such as 60 seconds) has elapsed, control returns to step 1004 and a new pause ad is obtained and displayed. Thus, in the described embodiment, the ads displayed during pause mode are changed periodically. Other embodiments may not change the pause ad. This would be desirable, for example, if the pause ad was a user-selected family photograph.

4. Example Method

A method of displaying an ad on a video replay system comprising: (i) determining that the video replay system should enter pause mode, (ii) obtaining an ad, and (iii) displaying the ad on a display of the video replay system during pause mode. Determining that the system should enter pause mode includes detecting that the user has pressed a pause button.

From the above descriptions, it will be apparent that the present invention disclosed herein provides a novel and advantageous method and system for assessing which ads to place on a client side video replay engine. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims and equivalents.

We claim:

1. A method of displaying an ad on a video replay system, the method comprising:
    obtaining a first ad;
    displaying, on a display of the video replay system, user selected program content stored at a storage medium of the video replay system;
    while the user selected program content is being displayed on the display of the video replay system, entering a pause mode in response to a user action that comprises pressing a pause key;
    upon entering the pause mode, the video replay system starting a timer and subsequently using the timer to determine whether a time delay greater than zero seconds has elapsed;
    after starting the timer but prior to the video replay system determining that the time delay has elapsed, continuing to display the user selected program content on the display of the video replay system, wherein the user selected program content displayed during the time delay is paused; and after the video replay system determines that the time delay has elapsed, displaying, on the display of the video replay system, the first ad instead of the user selected program content.

2. The method of claim 1, further comprising:
allowing a user to set the time delay.

3. The method of claim 1, wherein the first ad is a commercial ad.

4. The method of claim 1, wherein the first ad is a user-selected picture.

5. The method of claim 1, wherein the first ad is a user-selected still photograph.

6. The method of claim 1, wherein the first ad is a user-selected video clip.

7. The method of claim 1, wherein the first ad is a still commercial ad.

8. The method of claim 1, wherein the first ad is a commercial ad containing a video clip.

9. The method of claim 1, wherein the first ad is a video animation.

10. The method of claim 1, wherein the first ad is obtained from an ad placement engine.

11. The method of claim 1, wherein the first ad is obtained from external storage.

12. The method of claim 1, wherein the first ad is downloaded from a computer connected to the video replay system.

13. The method of claim 1, wherein the first ad is a full-page ad.

14. The method of claim 1, wherein the first ad occupies less than all of the display.

15. The method of claim 1, wherein the pause key is on the video replay system.

16. The method of claim 1, wherein the pause key is on the display of the video replay system.

17. The method of claim 1, wherein the pause key is on a remote control.

18. The method of claim 1, wherein the video replay system is a handheld video player.

19. The method of claim 1,
wherein the user selected program content comprises a selected television program, the method further comprising:
prior to displaying the user selected program content:
(i) receiving the selected television program content at the video replay system; and
(ii) storing the selected television program content at the storage medium of the video replay system.

20. The method of claim 1, wherein the display of the video replay system comprises a television set.

21. The method of claim 1, wherein the display of the video replay system comprises a cellular device.

22. The method of claim 1, further comprising:
the video replay system determining that the first ad has been displayed for a predetermined time period during the pause mode and the video replay system obtaining a second ad and causing the display of the video replay system to display the second ad instead of the first ad.

* * * * *